US008248220B2

(12) United States Patent
Nagamine et al.

(10) Patent No.: US 8,248,220 B2
(45) Date of Patent: Aug. 21, 2012

(54) SURROUNDING RECOGNITION SUPPORT SYSTEM

(75) Inventors: Noboru Nagamine, Anjo (JP); Kazuya Watanabe, Anjo (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 507 days.

(21) Appl. No.: 12/475,974

(22) Filed: Jun. 1, 2009

(65) Prior Publication Data

US 2009/0303027 A1 Dec. 10, 2009

(30) Foreign Application Priority Data

Jun. 4, 2008 (JP) ................................. 2008-146993

(51) Int. Cl.
*B60Q 1/00* (2006.01)
*B60Q 1/48* (2006.01)
*G08G 1/14* (2006.01)

(52) U.S. Cl. ..................... 340/435; 340/932.2; 340/903; 340/525; 340/692; 340/937; 340/461; 382/104; 180/169; 180/199; 348/119; 348/148

(58) Field of Classification Search .................. 340/435, 340/932.2
See application file for complete search history.

(56) References Cited

U.S. PATENT DOCUMENTS

| 7,295,227 | B1 * | 11/2007 | Asahi et al. ................... 348/118 |
| 7,598,887 | B2 * | 10/2009 | Sato et al. ................. 340/932.2 |
| 2002/0018047 | A1 | 2/2002 | Okada et al. |
| 2002/0104700 | A1 | 8/2002 | Shimazaki et al. |
| 2008/0100472 | A1 | 5/2008 | Mizusawa et al. |
| 2009/0208109 | A1 | 8/2009 | Kakinami et al. |
| 2010/0220189 | A1 | 9/2010 | Yanagi |

FOREIGN PATENT DOCUMENTS

| DE | 10 2006 044 803 A1 | 3/2008 |
| EP | 1 403 138 A1 | 3/2004 |
| EP | 1 686 007 A2 | 8/2006 |
| EP | 1 170 173 A1 | 11/2006 |
| EP | 1 839 948 A1 | 10/2007 |
| EP | 1 852 713 A1 | 11/2007 |
| EP | 1 916 846 A1 | 4/2008 |
| EP | 2 003 021 A2 | 12/2008 |
| EP | 2 003 021 A9 | 4/2009 |
| JP | 06-084079 A | 3/1994 |
| JP | 2785234 B2 | 8/1998 |
| JP | 2000-177512 A | 6/2000 |
| JP | 3179227 B2 | 6/2001 |
| JP | 2004-114977 A | 4/2004 |
| JP | 2004-130893 A | 4/2004 |

OTHER PUBLICATIONS

European Search Report dated Sep. 25, 2009 (6 pages).

(Continued)

*Primary Examiner* — Donnie Crosland
(74) *Attorney, Agent, or Firm* — Sughrue Mion, PLLC

(57) ABSTRACT

A surrounding recognition support system includes a distance marker display section displaying a distance marker on a monitor for a user to identify the distance marker, which indicates a distance from the user to a predetermined area and allows the user to visually sense the distance when the user looks at the monitor, and a sound output section emitting a special sound corresponding to the distance indicated by the distance marker when the distance marker is displayed on the monitor by the distance marker display section. The sound output section emits the special sound in response to a result of detection of an object detection portion detecting the object existing around the user within the predetermined area defined by the distance indicated by the distance marker.

10 Claims, 4 Drawing Sheets

OTHER PUBLICATIONS

European Office Action issued in European Application No. 09 161 796.9-1264 dated Mar. 16, 2011 (5 pages).

Japanese Office Action issued in Japanese Application No. 2008-146993 dated Jun. 21, 2012.

* cited by examiner

SURROUNDING RECOGNITION SUPPORT SYSTEM

CROSS REFERENCE TO RELATED APPLICATIONS

This application is based on and claims priority under 35 U.S.C. §119 to Japanese Patent Application 2008-146993, filed on Jun. 4, 2008, the entire content of which is incorporated herein by reference.

FIELD OF THE INVENTION

The present invention relates to a surrounding recognition support system.

BACKGROUND

According to an obstacle recognition technique in the field of automotive technology, an existence of an obstacle located around a vehicle is acknowledged to a driver of the vehicle by means of a sound, thereby allowing the driver to recognize the existence of the obstacle. For example, according to a known obstacle recognition technique described in JP3179227B2 (refer to Paragraphs 0014 to 0018, FIGS. 6 to 8) (hereinafter referred to as Patent document 1), the localization of a warning sound or simulated sounds such as driving sounds of other vehicles around a vehicle of a driver and a wheel slip sound of the vehicle of the driver is varied in accordance with balance adjustment of sound volumes of a plurality of speakers and in accordance with application of a delay sound in order to alert directions of other vehicles located around the vehicle to the driver. Accordingly, the driver is allowed to recognize an existence of an obstacle around the vehicle. Similarly, in addition to the localization of sounds emitted from the speakers in accordance with control for output of a delayed sound or in accordance with balance adjustment of sound volumes, according to a known obstacle recognition technique described in JP2785234B2 (refer to Paragraphs 0021 to 0026, FIG. 2) (hereinafter referred to as Patent document 2), an existence of an obstacle existing around a vehicle is acknowledged to a driver of the vehicle by means of patterns of warning sounds sorted by the location of the obstacle.

Moreover, in addition to the method to alert a driver to an existence of an obstacle around his/her vehicle by means of the above-described localization of sounds, a known method for tone assignment is described in JP1994-84079A (refer to Abstract, FIG. 6) (hereinafter referred to as Patent document 3). Tones are assigned to respective spatial positions according to the tone assignment method. An obstacle position recognition support system is equipped with a database memorizing predetermined tones for respective spatial positions and a reproducing device reproducing a tone selected based on the spatial position, so that each spatial position can be indicated by the selected tone according to the tone assignment method of Patent document 3.

However, according the obstacle recognition techniques of Patent document 1 and Patent document 2, a sound is required to be continuously emitted from the timing when an obstacle is located relatively far from the vehicle of the driver. In addition, a sound volume, a tone, an output cycle, a delay sound, and an initial reflected sound are required to be gradually varied, so that the driver perceives the variations. Accordingly, it is difficult for an existence of an obstacle such as a pedestrian unexpectedly approaching the vehicle to be notified to the driver. Further, in cases where a sound is continuously emitted, the driver may feel that the sound is noisy, or the driver accustoms himself/herself to the sound and may disadvantageously lose a sense of direction or distance relative to variations of the sound.

Moreover, according to the tone assignment method of Patent document 3, the driver is required to previously know which tone is set to which location. In addition, for example, according to such tone assignment method of Patent document 3, the tone assignment may be conducted on the basis of a consensus that a high frequency tone is emitted when an obstacle exists close to the vehicle of the driver. However, disadvantageously, the driver may not always perceive the existence of the obstacle on the basis of such consensus. Since various kinds of sounds are assigned in order to cover spatial positions, the driver may be confused when an obstacle unexpectedly appears close to the vehicle.

A need thus exists for a surrounding recognition support system, which is not susceptible to the drawbacks mentioned above.

SUMMARY OF THE INVENTION

According to an aspect of the present invention, a surrounding recognition support system includes a distance marker display section displaying a distance marker on a monitor for a user to identify the distance marker, which indicates a distance from the user to a predetermined area and allows the user to visually sense the distance when the user looks at the monitor, and a sound output section emitting a special sound corresponding to the distance indicated by the distance marker when the distance marker is displayed on the monitor by the distance marker display section. The sound output section emits the special sound in response to a result of detection of an object detection portion detecting the object existing around the user within the predetermined area defined by the distance indicated by the distance marker.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

An embodiment of the present invention will be explained with reference to the illustrations of the drawings as follows.

In the embodiment, a surrounding recognition support system is mounted in a vehicle and combined with a parking assist system assisting parking of the vehicle. The surrounding recognition support system is configured as a system alerting a driver (user) of the vehicle that an obstacle is approaching the vehicle.

Figure 1:
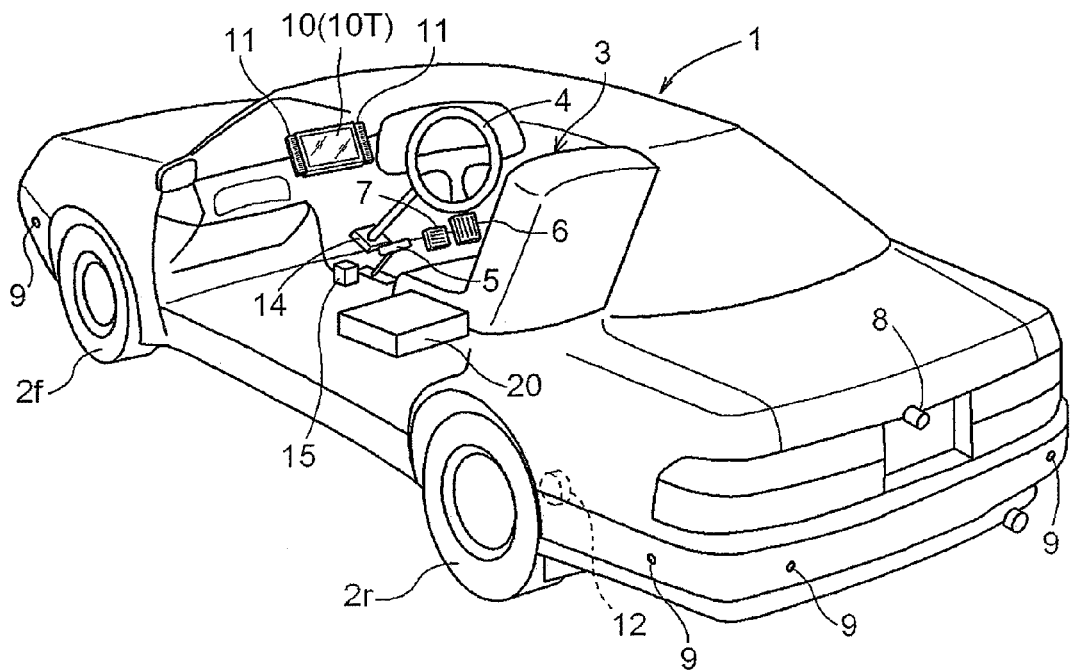
FIG. 1 is a perspective view illustrating a partially cutaway portion of a vehicle.
Figure 2:
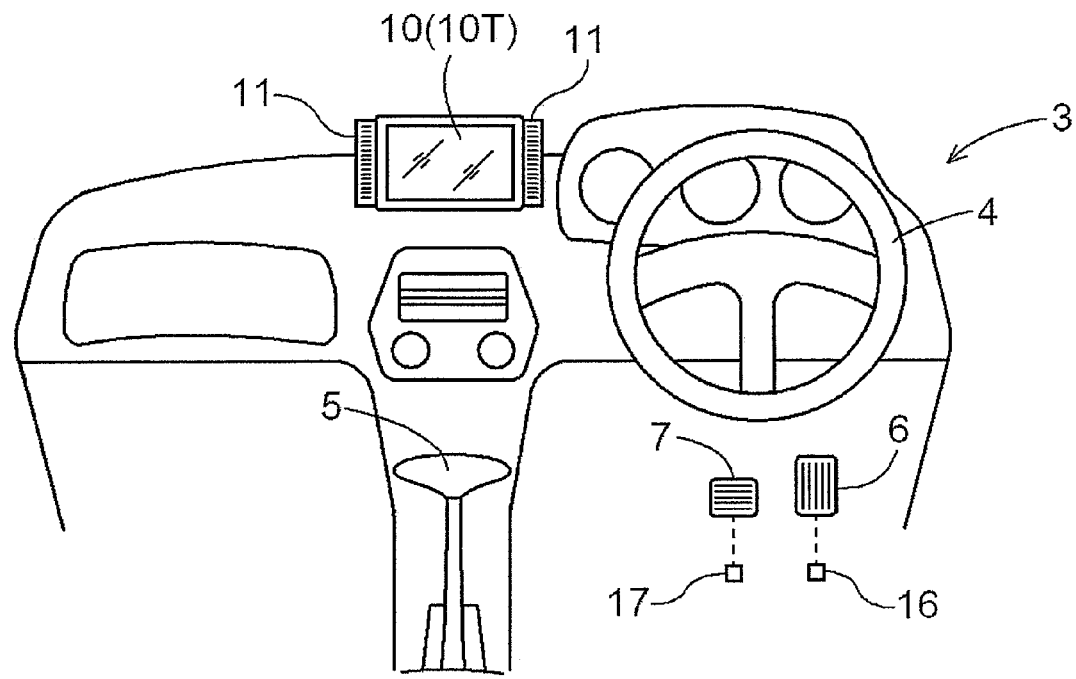
FIG. 2 is an explanation drawing of a front area seen from a passenger seat.

FIG. 1 and FIG. 2 show a basic configuration of a vehicle 1. The vehicle 1 includes a passenger seat 3. A steering wheel 4, a shift lever 5, an acceleration pedal 6, and a brake pedal 7 are arranged near the passenger seat 3 and at front side of the vehicle 1. The steering wheel 4 controls driving operation of front wheels 2f by transmitting a rotational operating force to the front wheels 2f. The shift lever 5 and the acceleration pedal 6 control a traveling speed of the vehicle 1. The brake pedal 7 allows controlling forces to act on the front wheels 2f and rear wheels 2r. Further, a monitor 10 is arranged at an upper position of a console near the passenger seat 3. A touch panel 10T is formed on a display surface of the monitor 10. Speakers 11 are provided at both side faces of the monitor 10. In addition, the speakers 11 may be arranged inside vehicle doors or on other interior decorating surfaces of the vehicle 1. A back camera 8 configuring an imaging device imaging a scene around the vehicle 1 is arranged at a rear end of the vehicle 1. The monitor 10 is a liquid crystal display monitor provided with a backlight. Surely, the monitor 10 may be a plasma display monitor or a CRT display monitor. Moreover, a pressure-sensitive panel or an electrostatic panel is applied as the touch panel 10T outputting location data of contact positions of fingers, and the like. Furthermore, the monitor 10 is applied as a display unit of a navigation system.

The back camera 8 includes an image pickup device such as a CCD (charge coupled device) and a CIS (CMOS image sensor) and serves as a digital camera outputting imaged information as information of moving images in real time. For example, the back camera 8 includes a wide-angle lens having a horizontal field of view spanning 140 degrees. The back camera 8 is arranged in the vehicle 1 while including an angle of depression of approximately 30 degrees, thereby imaging an area extending to approximately eight meters rearward from the vehicle 1.

A steering sensor 14 is provided at an operation system of the steering wheel 4, thereby measuring an operational direction and an operation amount of the steering wheel 4. A shift position sensor 15 is provided at an operation system of the shift lever 5, thereby determining a shift position. An acceleration sensor 16 is provided at an operation system of the acceleration pedal 6, thereby measuring an operation amount of the acceleration pedal 6. A brake sensor 17 is provided at an operation system of the brake pedal 7, thereby detecting whether or not the brake pedal 7 is operated.

Further, collision predicting sensors 9 are arranged respectively at two appropriate locations of a rear surface portion, lateral surface portions, and a front surface portion. For example, the collision predicting sensors 9 are configured by applying a millimeter wave radar, which detects an obstacle existing around the vehicle 1, or an image recognition system. Moreover, a rotation sensor 12 serving as a travel distance sensor is provided in the vehicle 1 for measuring at least one of the front wheels 2f and the rear wheels 2r.

Figure 3:
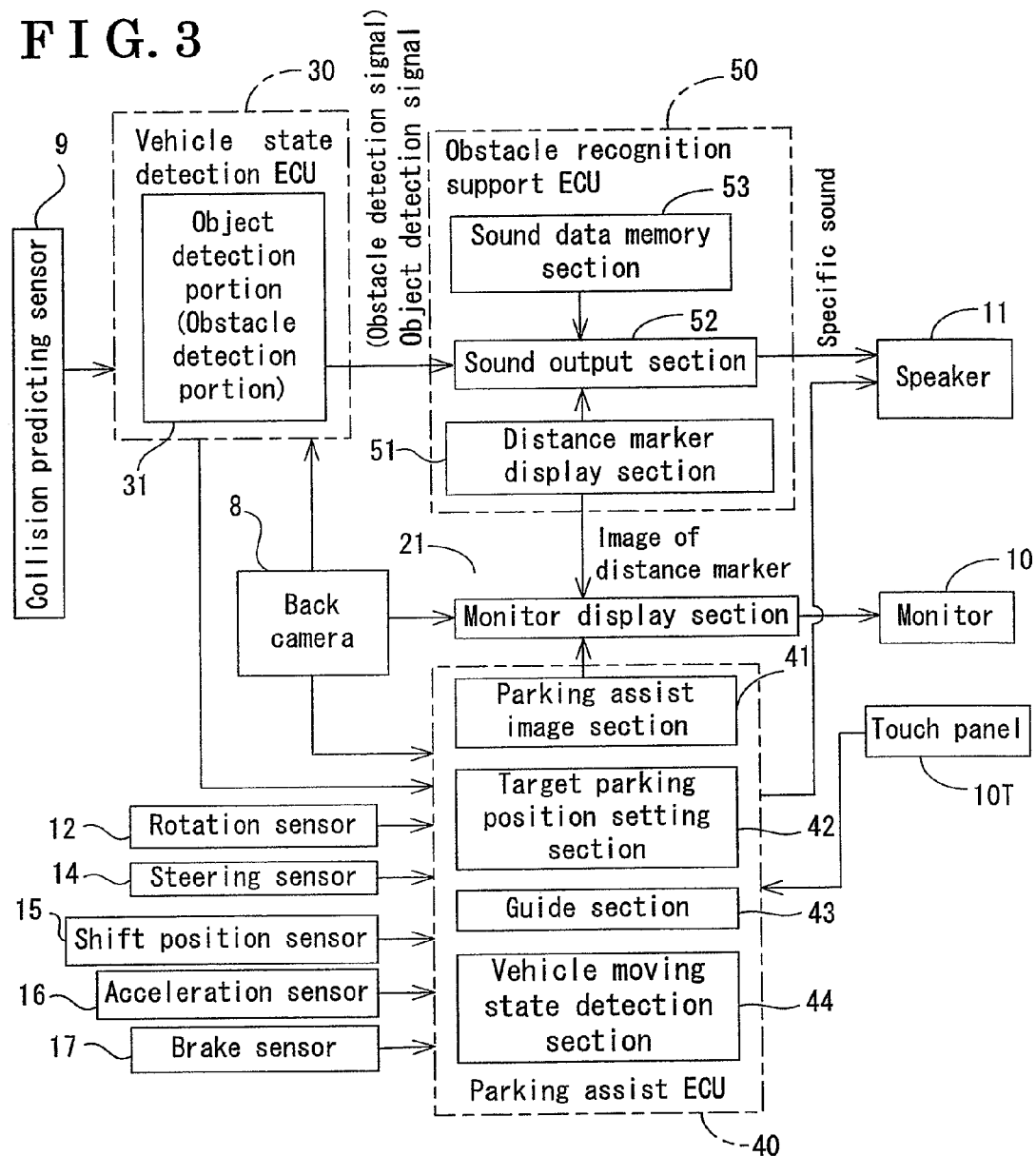
FIG. 3 is a functional block diagram illustrating a surrounding recognition support ECU of a surrounding recognition support system of an embodiment according to the present invention and showing functions in ECUs linked with the surrounding recognition support ECU.

An electronic control box 20 houses an ECU (electronic control unit) performing various electronic controls in the vehicle 1. FIG. 3 is a functional block diagram schematically showing functions of several ECUs specifically related to the surrounding recognition support system of the embodiment. Each ECU is configured as a computer serving as a core component. Accordingly, data are transmitted mutually between the ECUs by means of each network function. As shown in FIG. 3, the ECUs are a vehicle state detection ECU 30, a parking assist ECU 40, and a surrounding recognition support ECU 50. A monitor display section 21 used commonly in the parking assist ECU 40 and the surrounding recognition support ECU 50 is also shown in FIG. 3. The monitor display section 21 displays a variety of information on the monitor 10. The monitor display section 21 has functions to display images taken by the back camera 8 on the monitor 10 and to indicate information generated by the parking assist ECU 40 and the surrounding recognition support ECU 50.

The vehicle state detection ECU 30 has a function to generate information related to various vehicle states. In particular, the vehicle state detection ECU 30 according to the embodiment includes an object detection portion 31. The object detection portion 31 calculates a distance between the vehicle 1 and an object to be noticed and a relative position therebetween, on the basis of output signals of various sensors. More specifically, in the embodiment, the object detection portion 31 is configured as an obstacle detection portion 31. The obstacle detection portion 31 calculates a distance from the vehicle 1 to an obstacle or a relative position between the vehicle 1 and the obstacle on the basis of output signals of the collision predicting sensors 9, thereby detecting an obstacle against which the vehicle 1 may collide. Further, the obstacle detection portion 31 manipulates an image taken by the back camera 8, thereby being utilized for detection for an object to be noticed, or an obstacle. An object detection signal (hereinafter referred to as an obstacle detection signal in the embodiment) generated by the obstacle detection portion 31 is transmitted to the parking assist ECU 40, the surrounding recognition support ECU 50, and an occupant protection ECU.

The parking assist ECU 40 includes an input system. Signals of the touch panel 10T, the back camera 8, the rotation sensor 12, the steering sensor 14, the shift position sensor 15, the acceleration sensor 16, the brake sensor 17, or the like are inputted to the input system of the parking assist ECU 40. The parking assist ECU 40 further includes an output system outputting signals to the monitor 10 and the speakers 11. The parking assist ECU 40 includes functions of a parking assist image section 41, a target parking position setting section 42, a guide section 43, and a vehicle moving state detection section 44.

The parking assist image section 41 generates image information related to parking assistance and transmits the generated information to the monitor display section 21. Accordingly, the image information is displayed on the monitor 10. The target parking position setting section 42 sets a target parking position in which the vehicle 1 is to be parked. The guide section 43 calculates routes for guiding the vehicle 1 from a current position to the target parking position set by the target parking position setting section 42. The vehicle moving state detection section 44 detects a moving state of the vehicle 1 moving along the guided routes. The guide section 43 calculates a position of the vehicle 1 in motion on the basis of a result of detection of the vehicle moving state detection section 44.

Figure 4:
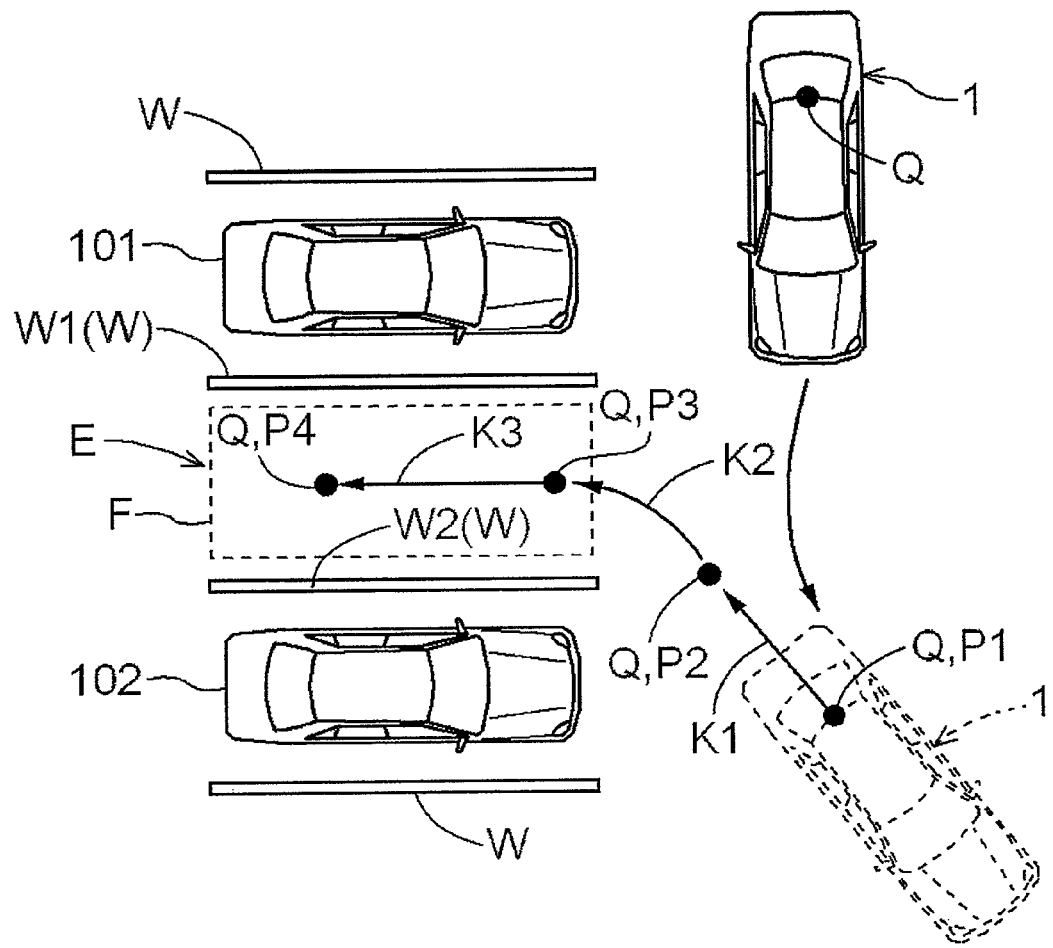
FIG. 4 is an explanation drawing showing routes for guiding a vehicle to a parking stall.

An example of parking assistance by means of the parking assist ECU 40 will be described below. FIG. 4 is an explanation diagram showing routes for guiding the vehicle 1 to a parking stall. A point Q is a reference point when the vehicle 1 is guided to the parking stall. According to the embodiment, the vehicle 1 is parked in a parking stall E sectioned by parking stall lines W and located on the right of a moving direction of the vehicle 1. Here, the vehicle 1 is parked in the parking stall E sectioned by a parking stall line W1 and a parking stall line W2. Other vehicles 101, 102 are already parked in parking stalls located at both adjacent sides of the parking stall E. A target parking area F is set in the parking stall E. The driver as the user assisted to park the vehicle 1 in the parking stall E drives the vehicle 1 to pass a front area of the parking stall E, which is to the right in FIG. 4, and turns the vehicle 1 to the left. Afterward, the vehicle 1 is driven so that the rear end of the vehicle 1 is parked toward the target parking area F. At this time, the reference point Q of the vehicle 1 is located at a vehicle position P1. The driver reverses the vehicle 1 straight in accordance with guidance from the guide section 43 so that the vehicle reference point Q shifts from the vehicle position P1 to a vehicle position P2 (route K1). Accordingly, the vehicle position P1 is a guidance start point. Next, the driver keeps the steering wheel 4 with a predetermined steering angle and further reverses the vehicle 1 while turning the vehicle 1 until the reference point Q shifts from the vehicle position P2 to a vehicle position P3 (route K2). Accordingly, the vehicle position P2 is a turn start point and the vehicle position P3 is a turn end point. Further, the driver returns the steering wheel 4 to a neutral position and reverses the vehicle 1 straight until the reference point Q shifts from the vehicle position Q3 to a vehicle position P4 (route K3). The vehicle position P4 is a target parking position, which is set on the basis of the target parking area F. When the reference point Q of the vehicle 1 reaches the vehicle position P4, the vehicle 1 is parked to fit in the parking stall E including the target parking area F.

Figure 5:
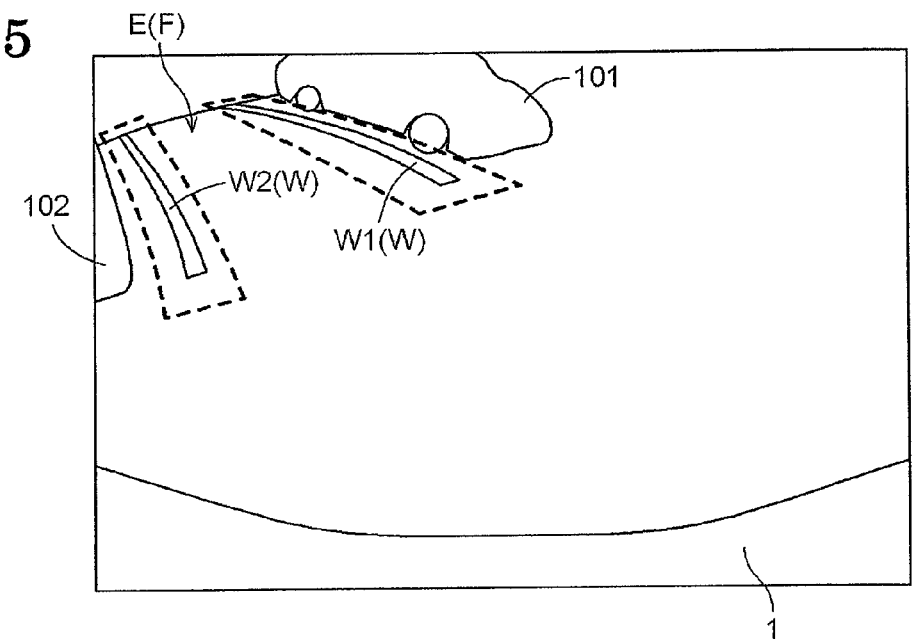
FIG. 5 is an explanation drawing showing a method to set a target parking area on the basis of an image taken by a back camera.

FIG. 5 is an explanation drawing showing a method to set the target parking area F in accordance with recognition of an image taken by the back camera 8 when the vehicle 1 is located at the guidance start point P1. As described above, the back camera 8 is arranged in the vehicle 1 while including the angle of depression. Accordingly, the shot image of the back camera 8 includes a rear bumper of the vehicle 1. Thus, a road surface (ground) located behind the vehicle 1 is imaged in the shot image. As described above, the vehicle 1 is stopped at the guidance start point P1 in a condition where the rear end of the vehicle 1 faces the parking stall E in order to park the vehicle 1 in the parking stall E. Accordingly, a scene including the parking stall E is taken by the back camera 8. For example, the target parking position setting section 42 recognizes images of the parking stall lines W1 and W2, thereby recognizing the parking stall E. Thus, the target parking position setting section 42 sets the target parking area F. After the target parking area F is set, the target parking position setting section 42 sets a coordinate system of the vehicle position P4 as the target parking position. When the target parking position P4 is set, the guide section 43 calculates routes for guiding the vehicle 1 to the parking stall E, on the basis of the target parking position P4 and the current guidance start point P1. That is, as shown in FIG. 4, the routes K1 and K3 in which the vehicle 1 is reversed straight and the route K2 in which the vehicle 1 is reversed while being turned are calculated, so that coordinate systems of the vehicle position P2 (turn start position) and the vehicle position P3 (turn end position), which are connection points in the routes K1, K2, and K3, are calculated.

Figure 6:
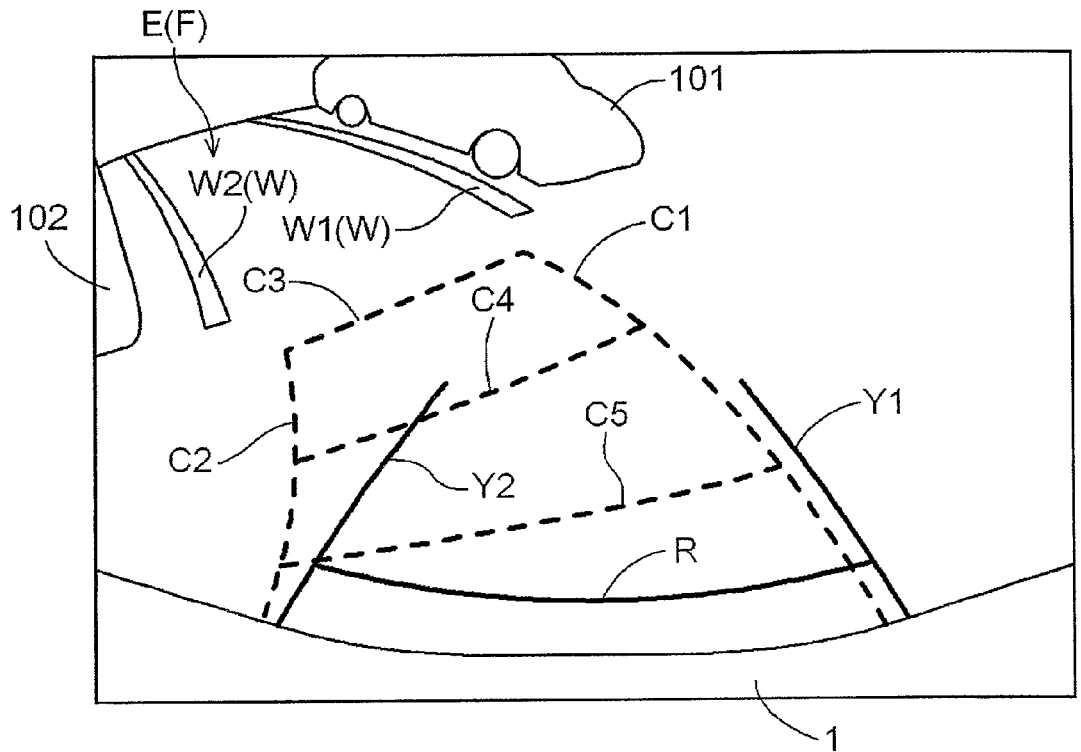
FIG. 6 is a view showing an example of a monitor display at a position where a parking guidance for parking the vehicle in the parking stall starts.

FIG. 6 is a view showing an example of a monitor display at the guidance start position P1. After the target parking position P4 is set, parking guidance combined with the shot image is displayed on the monitor 10 (overlap display, transparent composite display, or the like). The parking guidance includes, for example, extended vehicle width lines shown by symbols Y1 and Y2, respectively, an attention line shown by a symbol R and located one meter rearward from the vehicle 1, estimated drive lines shown by symbols C1 and C2, respectively, and reference distance lines of 2.7 meters, 1.0 meter, and 0.5 meter, which are shown by symbols C3, C4, and C5, respectively. In addition, the parking guidance is distinguished by color according to types of the parking assistance.

A state of the steering 4 while the vehicle 1 is reversed is detected by the steering sensor 14. A travel distance of the vehicle 1 is detected by the rotation sensor 12. On the basis of results of detection of the steering sensor 14 and the rotation sensor 12, the vehicle moving state detection section 44 detects a moving state of the vehicle 1. On the basis of a result of the vehicle moving state detection section 44, the guide section 43 calculates a coordinate system of the reference point Q when the vehicle 1 is moved from a coordinate system of the guidance start position P1. Afterwards, display positions of each parking guidance are calculated so as to correspond to the reference point Q, so that each parking guidance is displayed on the monitor 10 via the parking assist image section 41 and the monitor display section 21. Thus, the driver drives the vehicle 1 while referring to the parking guidance displayed on the monitor 10 so that the reference point Q of the vehicle 1 shifts to the target parking position P4, thereby completing the parking of the vehicle 1.

As shown in FIG. 3, the surrounding recognition support ECU 50 includes a distance marker display section 51, a sound output section 52, and a sound data memory section 53. The distance marker display section 51 appropriately displays a distance marker indicating a distance from the driver (user) of the vehicle 1 relative to a predetermined area. At a timing when the distance marker is displayed on the monitor 10 by the distance marker display section 51, the sound output section 52 reads sound data of a specific sound corresponding to the distance indicated by the distance marker from the sound data memory section 53, thereby emitting the specific sound from the speakers 11.

Figure 7:
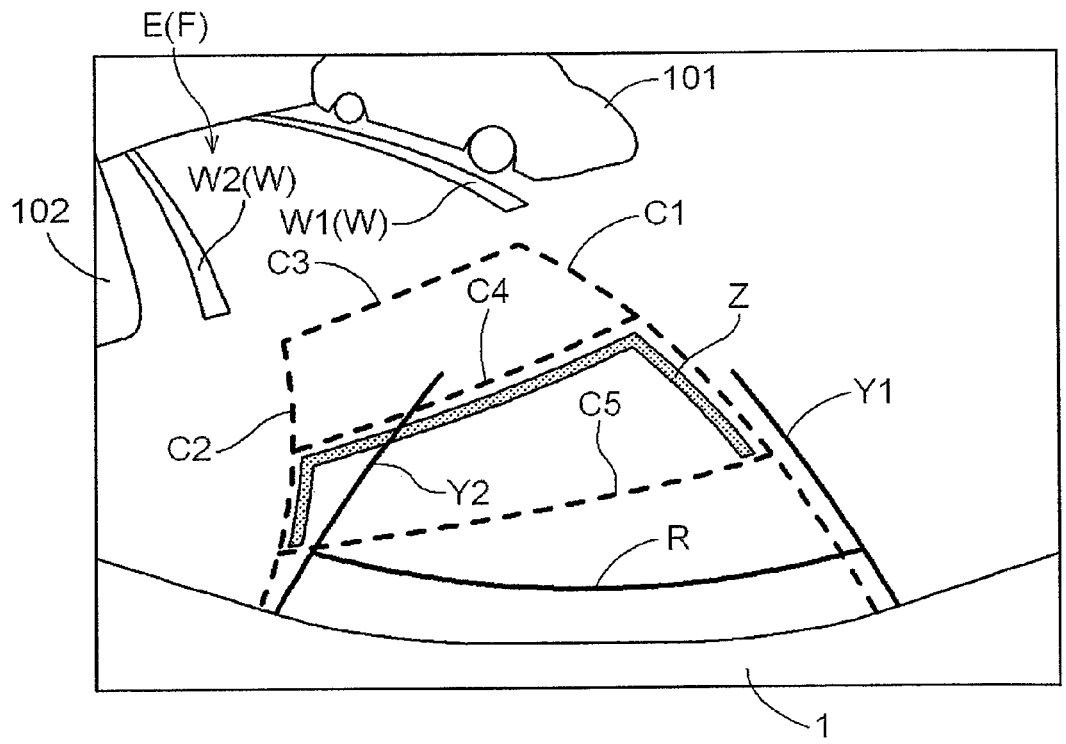
FIG. 7 is a view showing an example of a monitor display on which a distance marker Z serving as a distance marker is overlapped.

The distance marker in the embodiment is a distance marker allowing the user to visually sense the distance from the user (driver) relative to the predetermined area around the user when the user looked on the monitor 10. In the embodiment, a predetermine area located at a predetermined distance from the driver (user) seated at the passenger seat 3 is indicated on the monitor 10 by the distance marker. For example, as shown in FIG. 7, the distance marker is combined with an image taken by the back camera 8 together with various types of the parking guidance so as to be displayed on the monitor 10. In FIG. 7, the distance marker is shown as a distance marker Z drawn along an outer frame of an area defined by the estimated drive lines C1, C2, the reference distance line C4 of 1.0 meter, and the reference distance line C5 of 0.5 meter. It is preferable for the distance marker Z to be drawn by a vivid color. Accordingly, the driver visually recognizes a scene seen rearward from the vehicle 1 and the distance marker Z in an area located at a distance, which may be visually assumed by the user, through the monitor display. Further, when the distance marker Z is displayed on the monitor 10 or when the user identifies the distance marker Z displayed on the monitor 10, the sound output section 52 reads sound date of a specific sound, which is previously selected, from the sound data memory section 53, thereby emitting the specific sound from the speakers 11. In this case, an event where the specific sound is heard by the driver while the distance marker Z is visually recognized by the driver may be repeated several times not only once. For example, the specific sound may repeatedly be emitted while the distance marker Z is indicated on the monitor display several times at predetermined time intervals with the flashing of the distance marker Z. Further, the specific sound may be repeatedly emitted at predetermined time intervals while the distance marker Z is continuously indicated on the monitor display. Furthermore, the distance marker Z may be repeatedly indicated on the monitor display at predetermined time intervals while the specific sound is continuously emitted. In either case, the driver hears the specific sound emitted from the speakers 11 while visually recognizing the distance marker Z on the monitor 10. The driver repeatedly has such experience on a daily basis, so that a sense of distance (hereinafter, the sense of distance means that the user (driver) visually senses the distance between the user and the predetermined area around the user on the monitor 10) is connected with the specific sound by conditioned response. Accordingly, while such a conditioned reflex connection between the sense of distance and the specific sound is not established, it is preferable that an event where the specific sound is emitted while the distance marker Z is indicated on the monitor display is desirably frequently conducted. For example, in the case where emission of the specific sound and indication of the distance marker Z are simultaneously conducted at the start of parking assistance as described above, such conditioned reflex learning is favorably habitual for the driver. Moreover, since the driver is likely to carefully look at the monitor 10 when the monitor 10 is activated, emission of the specific sound and indication of the distance marker Z may be simultaneously conducted in the meantime. Surely, there is a case where parking assistance is started when the monitor 10 is activated.

The surrounding recognition support ECU 50 is configured so as to receive an obstacle detection signal transmitted from the vehicle state detection ECU 30. When an obstacle is detected in an area defined by a distance indicated by the distance maker Z, the sound output section 52 emits a specific sound, which corresponds to the distance indicated by the distance marker Z, from the speakers 11. The distance sensed by the driver is connected with the specific sound in accordance with the above-mentioned conditioned reflex learning. Accordingly, when the specific sound is emitted during driving, the driver instantaneously recognizes that any object exists while having the sense of distance, which is obtained from the above conditioned reflex learning. Consequently, the driver alertly takes action. For example, the driver looks at a surrounding environment around the vehicle 1. As a result, unexpected circumstances are prevented.

The specific sound does not need to be a startling sound such as a warning sound because the specific sound is a sound to be connected with an actual distance or a distance the driver senses by conditioned reflex. Comfortable and smoothing sounds such as a wind sound and a murmuring sound of a river may be applied as the specific sound. Accordingly, although a driver hears a startling warning sound with a conventional obstacle recognition system every time his/her vehicle approaches an obstacle, the driver does not hear such startling warning sound with the surrounding recognition support system of the embodiment. Thus, although the driver hears a smoothing sound instead of a startling warning sound, the driver recognizes an existence of an obstacle by conditioned reflex while having the sense of distance, thereby spontaneously looking at a surrounding environment around the vehicle. Consequently, an unprecedented new surrounding recognition technique is realized.

(1) As shown in FIG. 7, one distance marker Z indicating an area at a distant of 1.0 meter around the vehicle 1 is applied in the embodiment. However, a plurality of distance markers Z corresponding to different distances relative to the predetermined area around the user may be applied. In this case, different specific sounds are surely set to each distance marker Z. When each distance marker Z is displayed on the monitor 10, a specific sound assigned to each distance is emitted. In particular, it is favorable that indication of the distance markers Z and emission of the respective specific sounds are simultaneously and repeatedly conducted in order of length of the distances. As a result of the conditioned reflex learning, obstacles are detected in areas defined by a plurality of distances indicated by the respective distance markers Z. Accordingly, the sound output section 52 emits the specific sound assigned to each distance from the speakers 11. Consequently, the driver recognizes the existence of the obstacles with different senses of distance as the sense of difference of far and near distances.

(2) The distance marker Z indicated by bold lines is applied in the above-described embodiment. However, a distance marker indicated by other indication images may be applied. For example, a distance marker may be generated by visually distinguishing a predetermined area in a shot image of a surrounding environment around a vehicle from other areas according to differences in luminance and color saturation.

(3) In the above-described embodiment, the timing when a specific sound is emitted at the same time as a distance marker (distance marker Z) is indicated on the monitor display is equal to the timing when the monitor 10 is activated for the purpose of the conditioned reflex learning of the specific sound. However, the timing when the specific sound is emitted at the same time as the distance marker is indicated on the monitor display is not limited to the timing when the monitor 10 is activated. Various patterns of timing such as the timing when a driver carefully looks at the monitor 10 is arbitrarily selected, therefore being utilized for the conditioned reflex learning.

(4) In the above-described embodiment, the imaging device imaging a scene of a surrounding environment of the vehicle 1 is the back camera 8 only. However, when a front camera or side cameras are mounted in a vehicle, a distance marker (distance marker Z) may be combined with images taken by the front camera or the side cameras, thereby being displayed on the monitor 10.

(5) A configuration where a specific sound corresponding to a distance indicated by a distance marker (distant mark Z) displayed on the monitor 10 is emitted is described in the above-described embodiment. Alternatively, the distance marker may be indicated with special effects (visual effects, which draws a person's attention, such as flashing, luminance change, and saturation change). A configuration where a special sound is emitted every time a distance marker is highlighted with such special effects may be applied. In addition, a special effect in which a special sound is emitted while the distance marker Z is slowly drawn may be applied.

(6) The surrounding recognition support system according to the above-described embodiment is applied to detection for an obstacle but is not limited to such detection. For example, a parking stall is detected by image recognition, so that a target parking area in which a vehicle is to be parked is specified. Similarly as in the case of the detection for an obstacle of the embodiment, when the specified target parking area is located in an area defined by a distance indicated by a distance marker Z, a specific sound corresponding to the distance indicated by the distance marker Z is emitted. Accordingly, a driver may promptly recognize how close the vehicle approaches the target parking area and a positional relation between the vehicle and the target parking area. Thus, the surrounding recognition support system of the embodiment may contribute to an effective parking assistance. Likewise, traffic lights or road traffic signs are detected by the image recognition. Afterwards, the detected traffic lights or detected traffic signs are quickly notified to a driver. Accordingly, the driver is prevented from missing the traffic lights or road traffic signals.

The surrounding recognition support system according to the embodiment is not limited to in-vehicle installation but may be applied to all of the fields and techniques in which the user is required to sense an existence of an obstacle with the sense of distance. For example, the surrounding recognition support system may be applied to the field of safety measures for protecting an elderly person who walks alone or a person who moves by means of a wheelchair.

As described above, according to the configuration of the surrounding recognition support system of the embodiment, even when an object to be detected does not actually exist in a surrounding area around the user, the distance marker Z indicating the distance between the user and the predetermined area is displayed on the monitor 10 at the same time as the specific sound corresponding to the distance marker Z is emitted. When such event where the distance marker Z is displayed on the monitor 10 at the same time the specific sound is emitted is repeatedly on a daily basis, a conditioned reflex connection between a distance sensed by the user and a specific sound is established. That is, a visual memory by which the user visually senses the distance between the user and the predetermined area and an auditory memory by which the user hears the specific sound corresponding to the distance visually sensed by the user are integrated with each other on the basis of the distance sensed by the user. Accordingly, when the user hears the specific sound, the user senses the specific distance. Consequently, when the specific sound inducing the conditioned reflex is emitted on the basis of detection for an object existing around the user within the predetermine area, the user may promptly recognized that any object exists around the user while sensing the distance. Thus, the user alertly takes action. For example, the user looks at his/her surroundings. As a result, the user recognizes the object existing around the user. Thus, unexpected circumstances are prevented.

Further, according to the afore-mentioned configuration, the object existing around the user is an obstacle against the vehicle 1 driven by the user.

It is important for an obstacle around a vehicle be notified to an occupant of the vehicle. According to the configuration of the surrounding recognition support system of the embodiment, when the specific sound inducing the conditioned reflex is emitted, the user instantaneously recognizes the existence of the obstacle while sensing a distance relative to the obstacle. Accordingly, the user alertly takes action against the occurrence of the obstacle. For example, the user looks at his/her surroundings. Consequently, such action is useful to encourage the user to drive the vehicle 1 safely.

Furthermore, according to the afore-mentioned configuration, the object existing around the user is the target parking area F in which the vehicle 1 driven by the user is to be parked.

When a driver parks his/her vehicle, it is important for a parking stall to be notified to the driver. According to the configuration of the surrounding recognition support system of the embodiment, when the specific sound inducing the conditioned reflex is emitted, the driver instantaneously recognizes the parking stall E while sensing a distance relative to the parking stall E. Accordingly, the driver may instantaneously recognize how close the vehicle 1 approaches the parking stall E and the positional relation between the parking stall E and the vehicle 1. Consequently, the surrounding recognition support system of the embodiment may contribute to an effective parking assistance.

Moreover, according to the afore-mentioned configuration, when the monitor 10 is activated, the specific sound is emitted at the same time as the distance marker Z is displayed on the monitor 10 by the distance marker display section 51 so that the user identifies the distance marker Z.

Accordingly, every time the monitor 10 is activated, emission of the specific sound and indication of the distance marker Z are simultaneously conducted in the meantime. Consequently, the specific sound is connected with the distance marker Z by conditioned reflex. When the monitor 10 is activated at least at the timing when the surrounding recognition support system starts up, the user conveniently and easily learns the above-described conditioned reflex.

Further according to the afore-mentioned configuration, the distance marker Z is combined with an image of a surrounding environment around the user, which is taken by the imaging device 8, and displayed on the monitor 10.

Accordingly, the user may sense an actual distance from the relation between the distance marker Z and the shot image. In addition, the configuration where the distance marker Z combined with the shot image is displayed on a monitor display is incorporated in a usually used system. Every time the user uses the system, the user memorizes a distance indicated by the distance marker Z. Consequently, the user senses the distance obtained from the distance marker Z much more precisely. As a result, the distance connected with the specific sound by conditioned reflex becomes much more precise.

Furthermore, according to the afore-mentioned configuration, the distance marker Z includes a plurality of distance markers corresponding to different distances from the user relative to the predetermined area, and different sounds are set to the respective distance markers.

Accordingly, the different specific sounds are emitted to each distance marker Z. Consequently, a certain specific sound is connected with a far distance sensed by the user's conditioned reflex while a certain specific sound is connected with a near distance sensed by the user's conditioned reflex. Thus, when the user hears a certain specific sound corresponding to a far distance, the user recognizes an existence of an object such as an obstacle and a parking stall exists while having a sense of a far distance relative to the object. Further, when the user hears a different specific sound corresponding to a near distance, the user recognizes an existence of an object while having a sense of a near distance relative to the object. Moreover, when the specific sound corresponding to the far distance shifts to the specific sound corresponding to the near distance, the user senses an approach of the object. On the other hand, when the specific sound corresponding to the near distance shifts to the specific sound corresponding to the far distance, the user senses a departure of the object.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A surrounding recognition support system, comprising:
   a distance marker display section displaying a distance marker, a plurality of estimated drive lines and a plurality of reference lines on a monitor for a user to identify the distance marker, the estimated drive lines, and the reference lines, the distance marker indicating a distance from the user to a predetermined area and allowing the user to visually sense the distance when the user looks at the monitor, the estimated drive lines and the reference lines shown as a parking guidance;

an object detection portion detecting the object existing around the user within the predetermined area indicated by the distance marker;

a sound output section emitting a special sound corresponding to the distance indicated by the distance marker when the distance marker is displayed on the monitor by the distance marker display section, the sound output section emitting the special sound in response to a result of detection of the object detection portion; and wherein at least the distance marker is drawn along an outer frame of the predetermined area defined by the estimated drive lines and the reference distance lines.

2. The surrounding recognition support system according to claim 1, wherein the object existing around the user is an obstacle against a vehicle driven by the user.

3. The surrounding recognition support system according to claim 1, wherein the object existing around the user is a target parking area in which a vehicle driven by the user is to be parked.

4. The surrounding recognition support system according to claim 1, wherein when the monitor is activated, the specific sound is emitted when the distance marker is displayed on the monitor by the distance marker display section so that the user identifies the distance marker.

5. The surrounding recognition support system according to claim 1, wherein the distance marker is combined with an image of a surrounding environment around the user, which is taken by an imaging device, and displayed on the monitor.

6. The surrounding recognition support system according to any of claim 1, wherein the distance marker includes a plurality of distance markers corresponding to different distances from the user relative to the predetermined area, and different sounds are set to the respective distance markers.

7. The surrounding recognition support system according to claim 1 to 6, wherein when the monitor IS activated, the emission of the specific sound and indication of the distance marker are conducted.

8. The surrounding recognition support system according to claim 1 to 6, wherein a plurality of distance markers corresponding to different distances relative to the predetermined area.

9. The surrounding recognition support system according to claim 1 to 6, wherein the specific sound is repeatedly emitted.

10. The surrounding recognition support system according to claim 1 to 6, wherein the distance marker is indicated with luminance change or saturation change.

* * * * *